United States Patent
Hong et al.

(10) Patent No.: US 11,945,744 B2
(45) Date of Patent: Apr. 2, 2024

(54) METHOD AND APPARATUS FOR REUSING WASTEWATER

(71) Applicants: Samsung Engineering Co., Ltd., Seoul (KR); Samsung Electronics Co., Ltd., Suwon (KR)

(72) Inventors: Seok Hwan Hong, Seoul (KR); Dae Soo Park, Seoul (KR); Seung Joon Chung, Seoul (KR); Yong Xun Jin, Seoul (KR); Jae Hyung Park, Seoul (KR); Jae Hoon Choi, Seoul (KR); Jae Dong Hwang, Seoul (KR); Jong Keun Yi, Hwaseong (KR); Su Hyoung Cho, Hwaseong (KR); Kyu Won Hwang, Hwaseong (KR); June Yurl Hur, Hwaseong (KR); Je Hun Kim, Hwaseong (KR); Ji Won Chun, Hwaseong (KR)

(73) Assignees: SAMSUNG ENGINEERING CO., LTD., Seoul (KR); SAMSUNG ELECTRONICS CO., LTD, Gyeonggi-Do (KR)

( * ) Notice: Subject to any disclaimer, the term of this patent is extended or adjusted under 35 U.S.C. 154(b) by 0 days.

(21) Appl. No.: 18/134,906

(22) Filed: Apr. 14, 2023

(65) Prior Publication Data
US 2024/0034658 A1 Feb. 1, 2024

(30) Foreign Application Priority Data
Jul. 29, 2022 (KR) .......................... 10-2022-0094723

(51) Int. Cl.
*C02F 9/00* (2023.01)
*B01D 61/02* (2006.01)
(Continued)

(52) U.S. Cl.
CPC .............. *C02F 9/00* (2013.01); *B01D 61/025* (2013.01); *B01D 61/145* (2013.01);
(Continued)

(58) Field of Classification Search
None
See application file for complete search history.

(56) References Cited

U.S. PATENT DOCUMENTS

| 8,545,700 B1 | 10/2013 | Stroot et al. |
| 2014/0144839 A1 | 5/2014 | Choi et al. |

(Continued)

FOREIGN PATENT DOCUMENTS

| JP | 2008238051 A | 10/2008 |
| JP | 2015150518 A | 8/2015 |

(Continued)

OTHER PUBLICATIONS

Machine translation of KR 20190129631, pp. 1-28. (Year: 2019).*
(Continued)

*Primary Examiner* — Clare M Perrin
(74) *Attorney, Agent, or Firm* — Panitch Schwarze Belisario & Nadel LLP

(57) ABSTRACT

Disclosed are a method and apparatus for reusing wastewater. The method for reusing wastewater disclosed herein includes: generating a mixed wastewater by mixing multiple types of wastewater (S20); performing a first purification by passing the mixed wastewater through a flocculation-sedimentation unit (S40); performing a second purification by passing an effluent of the flocculation-sedimentation unit through a membrane bioreactor (MBR) (S60); performing a third purification by passing an effluent of the MBR through a reverse-osmosis membrane unit (S80); and reusing an effluent of the reverse-osmosis membrane unit as cooling water or industrial water (S100).

13 Claims, 5 Drawing Sheets

(51) Int. Cl.
    *B01D 61/14*     (2006.01)
    *B01D 61/58*     (2006.01)
    *B01D 65/02*     (2006.01)
    *C02F 1/52*     (2023.01)
    *C02F 1/56*     (2023.01)
    *C02F 1/66*     (2023.01)
    *C02F 1/00*     (2023.01)
    *C02F 1/20*     (2023.01)
    *C02F 1/44*     (2023.01)
    *C02F 1/50*     (2023.01)
    *C02F 3/12*     (2023.01)
    *C02F 3/30*     (2023.01)
    *C02F 3/34*     (2023.01)
    *C02F 5/08*     (2023.01)
    *C02F 101/14*     (2006.01)
    *C02F 101/16*     (2006.01)
    *C02F 101/30*     (2006.01)
    *C02F 103/08*     (2006.01)

(52) U.S. Cl.
CPC ............ *B01D 61/147* (2013.01); *B01D 61/58* (2013.01); *B01D 65/02* (2013.01); *C02F 1/5236* (2013.01); *C02F 1/56* (2013.01); *C02F 1/66* (2013.01); *B01D 2317/025* (2013.01); *C02F 2001/007* (2013.01); *C02F 1/20* (2013.01); *C02F 1/441* (2013.01); *C02F 1/444* (2013.01); *C02F 1/50* (2013.01); *C02F 3/1268* (2013.01); *C02F 3/30* (2013.01); *C02F 3/342* (2013.01); *C02F 5/08* (2013.01); *C02F 2101/14* (2013.01); *C02F 2101/16* (2013.01); *C02F 2101/30* (2013.01); *C02F 2103/08* (2013.01); *C02F 2301/046* (2013.01); *C02F 2303/04* (2013.01); *C02F 2303/16* (2013.01)

(56) References Cited

U.S. PATENT DOCUMENTS

| | | |
|---|---|---|
| 2021/0206679 A1 | 7/2021 | Chung et al. |
| 2022/0041480 A1 | 2/2022 | Liu et al. |

FOREIGN PATENT DOCUMENTS

| | | | | |
|---|---|---|---|---|
| JP | 201925438 A | 2/2019 | | |
| KR | 1049156 | 3/1997 | | |
| KR | 970010663 A | 3/1997 | | |
| KR | 19980078119 A | 11/1998 | | |
| KR | 19990014574 A | 2/1999 | | |
| KR | 100193785 B1 | 6/1999 | | |
| KR | 20000000456 A | 1/2000 | | |
| KR | 20000002730 A | 1/2000 | | |
| KR | 100347864 B1 | 8/2002 | | |
| KR | 20030069354 A | 8/2003 | | |
| KR | 100430578 B1 | 5/2004 | | |
| KR | 100853077 B1 | 8/2008 | | |
| KR | 100893565 B1 | 4/2009 | | |
| KR | 101010733 B1 | 1/2011 | | |
| KR | 20120008209 A | 1/2012 | | |
| KR | 101199583 B1 | 11/2012 | | |
| KR | 101256132 B1 | 4/2013 | | |
| KR | 101430800 B1 | 8/2014 | | |
| KR | 20150061877 A | 6/2015 | | |
| KR | 20160043322 | * | 4/2016 | ............ C02F 9/04 |
| KR | 101881995 B1 | 8/2018 | | |
| KR | 20190078459 A | 7/2019 | | |
| KR | 20190129631 | * | 11/2019 | ............ C02F 1/583 |
| KR | 20190129631 A | 11/2019 | | |
| KR | 102067164 B1 | 1/2020 | | |
| KR | 102116925 B1 | 5/2020 | | |
| KR | 20210071474 A | 6/2021 | | |
| KR | 20220096414 A | 7/2022 | | |

OTHER PUBLICATIONS

Machine translation of KR 20160043322, pp. 1-11. (Year: 2016).*
Notice of Allowance, dated Jul. 19, 2023, issued by the Korean Intellectual Property Office issued in Korean Application No. 10-2022-0094723, 5 pages.
Notice of Non-Final Rejection, dated Mar. 31, 2023, issued by the Korean Intellectual Property Office in Korean Application No. 10-2022-0094723, 17 pages.

* cited by examiner

Inject CO₂ through the stirrer
(downward)

Inject CO₂ through the pipe
(upward)

METHOD AND APPARATUS FOR REUSING WASTEWATER

CROSS-REFERENCE TO RELATED APPLICATION

This application is based on and claims priority under 35 U.S.C. § 119 to Korean Patent Application No. 10-2022-094723, filed on Jul. 29, 2022, in the Korean Intellectual Property Office, the disclosure of which is incorporated by reference herein in its entirety.

BACKGROUND

1. Field

The disclosure relates to a method and apparatus for reusing wastewater. More particularly, the disclosure relates to a method and apparatus for reusing wastewater, which have a simple process and can reduce investment and operating costs while improving an operator's safety.

2. Description of the Related Art

In a semiconductor manufacturing process, numerous inorganic chemicals of hydrofluoric acid, other acids and alkalis are used, from which hydrofluoric acid wastewater and other acidic and alkaline wastewater are produced.

Hydrofluoric acid wastewater is generally characterized by an acidic condition of pH 4 or less, and contains 30 mg/L or more of fluoride components.

Other acidic wastewater is generally characterized by an acidic condition of pH 4 or less, and contain hydrogen peroxide, organic matter, particulate contaminants and heavy metal ions.

Alkaline wastewater is generally characterized by an alkaline condition of pH 9 or higher, and contains hydrogen peroxide, organic matter, particulate contaminants, ammonia, and heavy metal ions.

Some well-known fluoride-containing mixed wastewater treatment technologies include a technology which applies expensive polyaluminium chloride and sodium aluminate as flocculants in a flocculation sedimentation process for the treatment of fluoride-containing wastewater among steel-making wastewater from steel mills. Aluminum-based chemicals used in the art are used for the purpose of maximizing fluoride removal efficiency, and are relatively more expensive than slack lime or sodium hydroxide used in the art, and thus may have issues with increased operational costs of wastewater treatment processes.

PRIOR ART DOCUMENTS

Korean Patent No. 10-1010733: METHOD OF TREATING FLUORIDE-CONTAINING WASTEWATER

SUMMARY

Additional aspects will be set forth in part in the description which follows and, in part, will be apparent from the description, or may be learned by practice of the presented embodiments of the disclosure.

Provided is a method for reusing wastewater, which can reduce investment and operating costs while improving an operator's safety.

Provided is an apparatus for reusing wastewater, which can reduce investment and operating costs while improving an operator's safety.

According to an aspect of the disclosure, a method for reusing wastewater includes:
producing a mixed wastewater by mixing multiple types of wastewater (S20);
performing a first purification by passing the mixed wastewater through a flocculation-sedimentation unit (S40);
performing a second purification by passing an effluent of the flocculation-sedimentation unit through a membrane bioreactor (MBR) (S60);
performing a third purification by passing an effluent of the MBR through a reverse-osmosis membrane unit (S80); and
reusing an effluent of the reverse-osmosis membrane unit as a cooling water or industrial water (S100).

The step (40) may include step (S40-2) of producing a first treated water by passing the mixed wastewater through a first flocculation reactor, step (S40-4) of producing a third treated water by passing the first treated water through a third flocculation reactor, step (S40-6) of producing a fourth treated water by passing the third treated water through a fourth flocculation reactor, and step (S40-8) of producing a fifth treated water and sludge by passing the fourth treated water through a sedimentation tank.

The method of reusing wastewater may further include, between the step (S40-2) and the step (S40-4), step (S40-3) of producing a second treated water by passing the first treated water through a second flocculation reactor, wherein in this case, the step (S40-4) may be a step of producing the third treated water by passing the second treated water, not the first treated water, through the third flocculation reactor.

A first chemical and a second chemical may be introduced into the first flocculation reactor, a third chemical may be introduced into the third flocculation reactor, and a fourth chemical may be introduced into the fourth flocculation reactor.

The first chemical may include slack lime, the second chemical may include a hydrogen peroxide scavenger, the third chemical may include a pH control agent, and the fourth chemical may include an anionic polymer flocculant.

There may be no chemical introduced into the second flocculation reactor.

A portion of the sludge produced in the step (S40-8) may be returned to the first flocculation reactor, while the remainder of the sludge may be discharged to the outside.

A pH of the first flocculation reactor may be about 10.0 to about 11.5, and a pH of the third flocculation reactor may be about 6.5 to about 7.5.

The step (S60) may include step (S60-2) of producing a sixth treated water by passing the fifth treated water through the anoxic tank, step (S60-4) of producing a seventh treated water by passing the sixth treated water through the aerobic tank, and step (S60-6) of producing an eighth treated water by passing the seventh treated water through a separation membrane tank.

The aerobic tank may have a fifth chemical or no chemical introduced thereinto, and the anoxic tank and the separation membrane tank may have no chemical introduced thereinto.

The fifth chemical may include sodium hydroxide.

The method of reusing wastewater may further include step (S60-8) of passing an unfiltered water remaining in the separation membrane tank through a deaeration tank, and step (S60-10) of passing an effluent of the deaeration tank through the anoxic tank.

The method of reusing wastewater may further include, between the step (S60) and the step (S80), step (S70) of introducing at least one from among a third chemical, a sixth chemical, and a seventh chemical into the effluent of the MBR prior to being introduced into the reverse-osmosis membrane unit.

The third chemical may include a pH control agent, the sixth chemical may include a disinfectant, and the seventh chemical may include an anti-scaling agent.

The effluent of the MBR may be adjusted to a pH of about 5.8 to about 6.5 and then supplied to the reverse-osmosis membrane unit.

The method of reusing wastewater may further include, between the step (S80) and the step (S100), step (S90) of cleaning a reverse-osmosis membrane by adding an eighth chemical to the reverse-osmosis membrane unit, wherein the eighth chemical may include a clean-in-place (CIP) cleaning agent.

According to another aspect of the disclosure, an apparatus for reusing wastewater includes:
 a first flocculation reactor configured to produce a first treated water by flocculating a mixed wastewater;
 a third flocculation reactor configured to produce a third treated water by further flocculating the first treated water;
 a fourth flocculation reactor configured to produce a fourth treated water by further flocculating the third treated water;
 a sedimentation tank configured to produce fifth treated water and sludge by settling the fourth treated water;
 an anoxic tank configured to produce a sixth treated water by performing a denitrification reaction on the fifth treated water;
 an aerobic tank configured to produce a seventh treated water by removing organic matter from the sixth treated water and performing a nitrification reaction on the sixth treated water;
 a separation membrane tank configured to produce an eighth treated water by removing particulate matter from the seventh treated water; and
 a reverse-osmosis membrane unit configured to produce a concentrated water and a produced water by removing organic matter and inorganic ion components from the eighth treated water.

The apparatus for reusing wastewater may further include a second flocculation reactor disposed between the first flocculation reactor and the third flocculation reactor.

The first flocculation reactor may be configured to operate at a pH of about 10.0 to about 11.5, and the third flocculation reactor may be configured to operate at a pH of about 6.5 to about 7.5.

The apparatus for reusing wastewater may further include a mixer mounted in the third flocculation reactor, wherein the mixer may be configured to introduce carbon dioxide into the third flocculation reactor therethrough.

The apparatus for reusing wastewater may further include a first return line configured to return a portion of the sludge produced in the sedimentation tank to the first flocculation reactor.

The apparatus for reusing wastewater may further include a deaeration tank configured to remove dissolved oxygen from an unfiltered water remaining in the separation membrane tank and introduce the unfiltered water into the anoxic tank, and a second return line configured to return the unfiltered water remaining in the separation membrane tank to the deaeration tank.

The separation membrane tank may include a microfiltration membrane (MF) or an ultrafiltration membrane (UF).

The apparatus for reusing wastewater may be configured such that an effluent of the separation membrane tank is adjusted to a pH of about 5.8 to about 6.5 before being supplied to the reverse-osmosis membrane unit.

The reverse-osmosis membrane unit may include a brackish water reverse-osmosis membrane or a seawater reverse-osmosis membrane.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
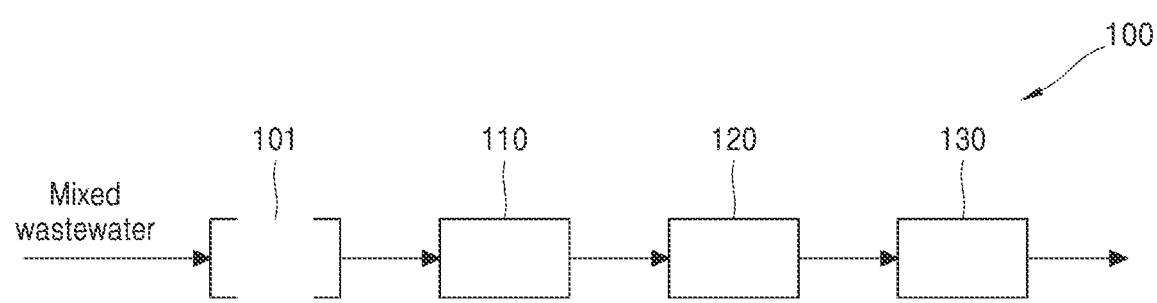
FIG. 1 is a diagram schematically illustrating a method and apparatus for reusing wastewater, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinbelow, a method and apparatus for reusing wastewater according to an embodiment are described in greater detail with reference to the drawings.

As used herein, the term "mixed wastewater" refers to wastewater containing a mixture of hydrofluoric acid wastewater, other acidic wastewater, and alkaline wastewater produced from the semiconductor manufacturing process, or display manufacturing process.

As used herein, "membrane bioreactor (MBR)" refers to a reactor which combines a separation membrane process, such as microfiltration or ultrafiltration, with a biological wastewater treatment process such as an activated sludge process.

FIG. 1 is a diagram schematically illustrating a method and apparatus 100 for reusing wastewater according to an embodiment.

Referring to FIG. 1, a method for reusing wastewater according to an embodiment may include: producing a mixed wastewater by mixing multiple types of wastewaters (S20); performing a first purification by passing the mixed wastewater through a flocculation-sedimentation unit (S40); performing a second purification by passing an effluent of the flocculation-sedimentation unit through an MBR (S60); performing a third purification by passing an effluent of the MBR through a reverse-osmosis membrane unit (S80); and reusing an effluent of the reverse-osmosis membrane unit as a cooling water or industrial water (S100).

The mixed wastewater produced in the step (S20) may be supplied to a flocculation-sedimentation unit 110 via a raw water tank 101.

In the step (S20), the mixed wastewater may include particulate matter, high-concentration organic matter, and ionic matter. Accordingly, the mixed wastewater, when untreated, may be difficult to utilize as a reusable water appropriate for use as cooling water or industrial water.

In addition, the step (S20) may be a step of producing a mixed wastewater by mixing multiple types of wastewaters, wherein a wastewater containing a substance hindering flocculation and sedimentation of wastewater is excluded therefrom to thereby facilitate flocculation and sedimentation and inhibit inorganic contamination in a subsequent reverse-osmosis membrane process. In particular, a flocculation-sedimentation process may focus on controlling inorganic contaminants that have a major influence on membrane contamination in a reverse-osmosis membrane process. More specifically, when removing fluoride from wastewater by using calcium-based flocculants, the concentration of calcium in the settled treated water needs to be controlled to a level that does not cause inorganic contamination in the reverse-osmosis membrane process, and this requires classification of appropriate wastewater. This aims not to control the concentration of calcium alone, but to control the calcium concentration to a certain concentration or less while maintaining the fluoride concentration to a certain concentration or less, which is the original purpose. This goal is difficult to achieve without appropriate wastewater selection and headwater classification.

In particular, when a substance hindering flocculation and sedimentation is introduced into wastewater, the fluoride concentration can be controlled to a desired concentration or less, but in this case, calcium is generally found in the settled treated water in a concentration that causes inorganic scales in a reverse-osmosis membrane process or higher. In particular, common substances known to hinder flocculation and sedimentation include phosphates. Phosphates are bonded to alkali earth metals, such as Ca and Mg, to increase the solubility of Ca and Mg and hinder sedimentation, and hinder the flocculation of Ca ions and Mg ions of a concentration 5-10 times the concentration of phosphates. This is referred to as calcium phosphate sequestration. Long-chain phosphates are the most effective in terms of this hindering effect, followed by diphosphates and triphosphates. Orthophosphates have a limited flocculation hindering effect, but have shown some hindering effect in test results. Long-chain phosphates include inorganic polyphosphates and organic polyphosphates, and the organic polyphosphates have a greater flocculation hindering effect. Consequently, when dealing with wastewater containing phosphates, excluding phosphates from wastewater to be reused, by classifying phosphates from sources of wastewater, amounts to an appropriate method to facilitate the operation of a reverse-osmosis membrane process. The total phosphorus (T-P) concentration of 10 mg/L or less in wastewater may be suitable for a reusing process operation.

The step (S40) may be a step of which the objective is to reduce scales in would-be-treated water being supplied in the reverse-osmosis process by keeping the fluoride concentration in a mixed wastewater having a fluoride concentration exceeding a reference value (e.g., 30 mg/L) to a reference value or below, and lowering the concentration of ions derived from a flocculant (e.g., Ca concentration) to a reference value (e.g., 200 mg/L) or below.

A method for reusing wastewater according to an embodiment may apply the above-described first flocculation-sedimentation process (that is, step (S40)) to produce a treated water quality suitable for a raw water of the reverse-osmosis process, and as a result, can reduce the investment and operating costs compared to a reusing process using conventional first flocculation-sedimentation process and second flocculation-sedimentation process.

The step (S60) may be a step for removing organic contaminants and nitrogen compounds present in wastewater.

The step (S80) may be, as the main process of the method for reusing wastewater, a step of which the objective is to produce a treated water suitable for a reusable water usage site by removing organic matters and inorganic ion matters remaining in MBR treated water.

Figure 2:
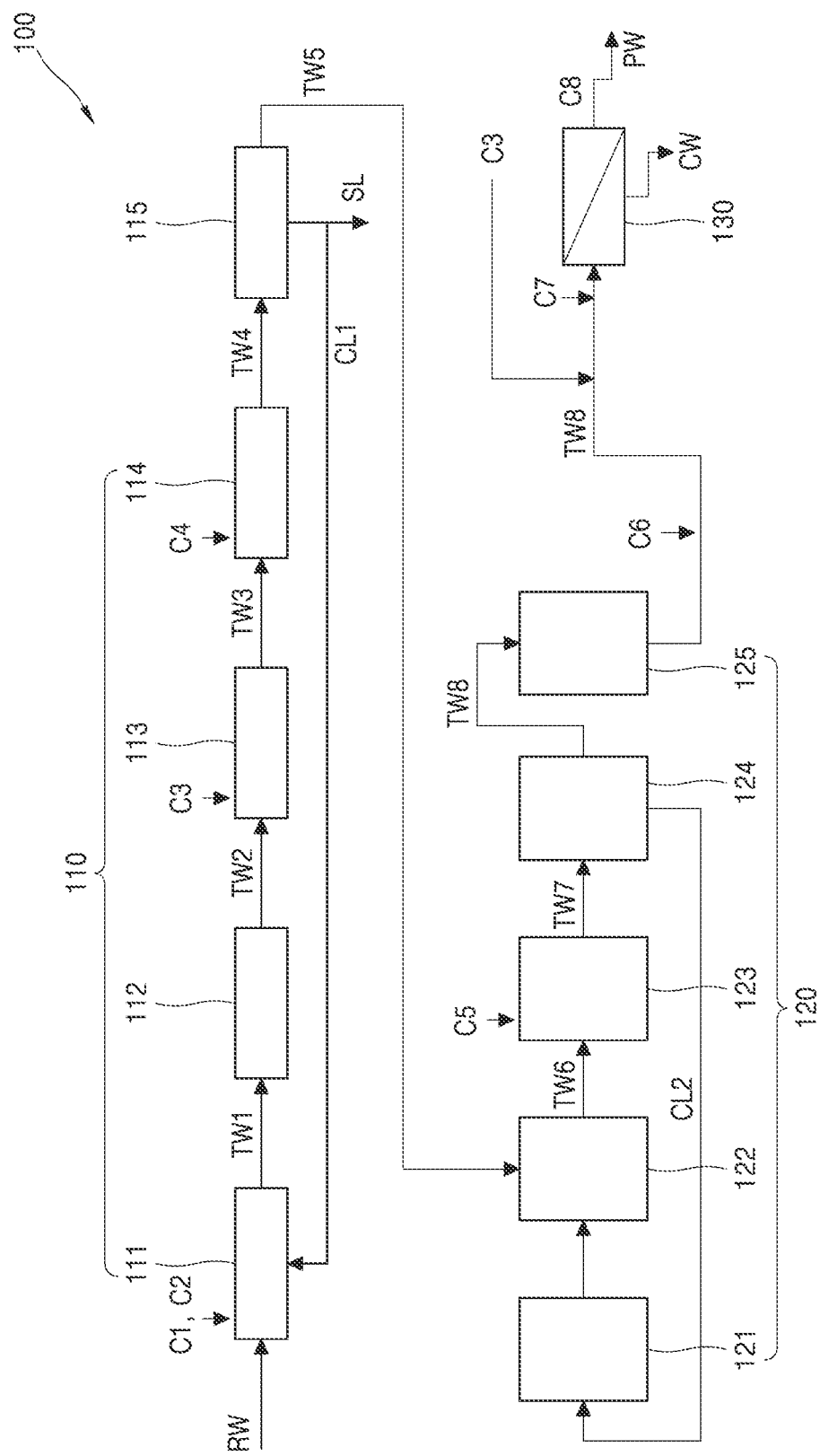
FIG. 2 is a diagram showing specific configurations of the method and apparatus for reusing wastewater depicted in FIG. 1.
Figure 4:
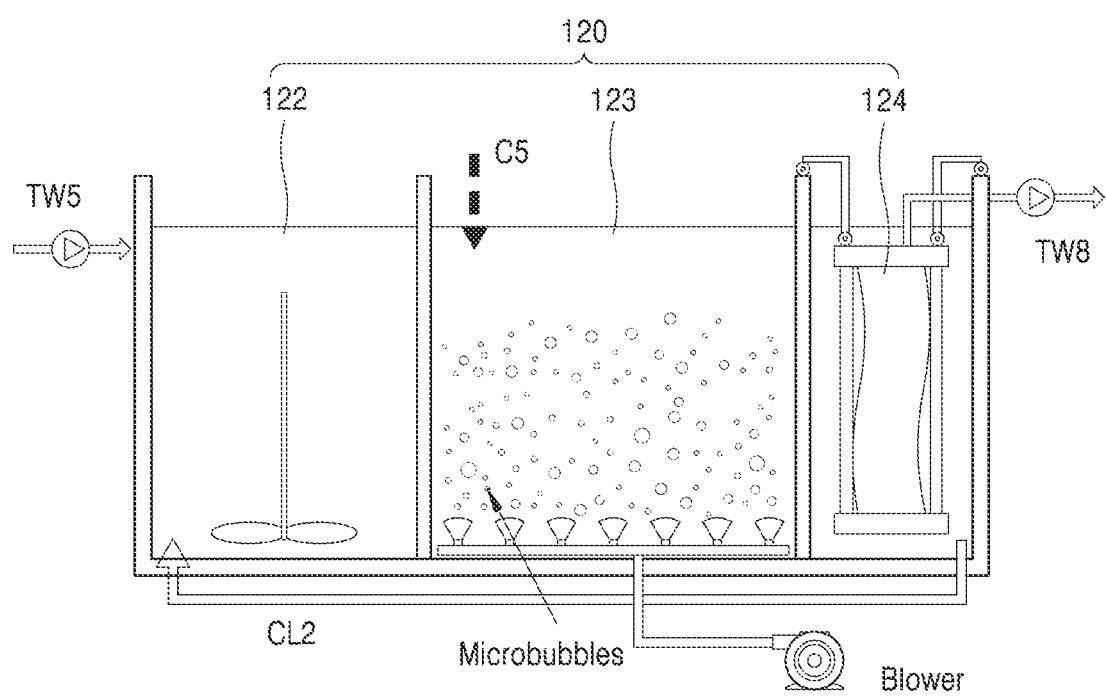
FIG. 4 is a diagram showing specific configurations of an MBR in the method and apparatus for reusing wastewater depicted in FIG. 1.

FIG. 2 is a diagram showing specific configurations of a method and apparatus 100 for reusing wastewater depicted in FIG. 1, and FIG. 4 is a diagram showing specific configurations of an MBR 120 in the method and apparatus 100 for reusing wastewater depicted in FIG. 1.

Referring to FIG. 2, the step (S40) may include step (S40-2) of producing a first treated water TW1 by passing a mixed wastewater RW through a first flocculation reactor 111, step (S40-4) of producing a third treated water TW3 by passing the first treated water TW1 through a third flocculation reactor 113, step (S40-6) of producing fourth a treated water TW4 by passing the third treated water TW3 through a fourth flocculation reactor 114, and step (S40-8) of producing a fifth treated water TW5 and sludge SL by passing the fourth treated water TW4 through a sedimentation tank 115.

A first chemical C1 and a second chemical C2 may be introduced into the flocculation reactor 111.

The first chemical C1 may serve to remove calcium, fluoride, and the like, which cause scales to build up in a reverse-osmosis membrane unit 130, from the mixed wastewater RW.

The first chemical C1 may contain slake lime ($Ca(OH)_2$), CaO, $CaCl_2$), $Ca(NO_3)_2$, CaS, $CaCO_3$, $Mg(OH)_2$, $MgCl_2$, or a combination thereof.

The second chemical C2 may include a hydrogen peroxide scavenger. Therefore, the second chemical C2 may play a role of suppressing a function of hydrogen peroxide of inhibiting the reduction of nitrite and nitrate to nitrogen gas in an anoxic tank 122, and may further play a role of suppressing the action of killing microorganisms in the anoxic tank 122 and an aerobic tank 123.

The hydrogen peroxide scavenger may include catalase, peroxidase, xanthine oxidase, metal porphyrin (e.g., manganese (III) (meso tetrakis) (4-benzoic acid) porphyrin, manganese (III) (meso tetrakis) (1-methyl-4-pyridyl)porphyrin), sodium hydrogen sulfite, sodium thiosulfate, potassium iodide, sodium bromide, an iron salt ($FeCl_3$, $Fe_2(SO_4)_3$, $Fe(NO_3)_3$), or a combination thereof.

In addition, the pH in the first flocculation reactor 111 may be about 10.0 to about 11.5. When the pH in the first flocculation reactor 111 is less than 10, the fluoride concentration in a produced water PW increases, and the operation state of the reverse-osmosis membrane unit 130 may become poor, and if the pH in the first flocculation reactor 111 exceeds 11.5, the calcium concentration increases and the operation state of the reverse-osmosis membrane unit 130 may become poor.

A third chemical C3 may be introduced into the third flocculation reactor 113.

The third chemical C3 may include a pH control agent and the pH control agent may include carbon dioxide.

The injection amount of carbon dioxide into the third flocculation reactor 113 may be influenced by the pH and the fluoride concentration of the first treated water TW1 or the second treated water TW2, and carbon dioxide may be injected at a concentration of 200-1,500 mg $CO_2$/L. Carbon dioxide may be dissolved in water and exist in a different state depending on the pH, and exist as alkalinity-inducing material (see chemical equations 1-1 to 1-3) and this may be utilized in a subsequent bioprocessing process (that is, the anoxic tank 122 and the aerobic tank 123).

In the step (S40-4), if carbon dioxide is injected into a first treated water TW1 or a second treated water TW2, the concentration of hydrogen ions in the first treated water TW1 or the second treated water TW2 increases as shown in chemical equations 1-1 to 1-3, thus causing a decrease in pH.

$$CO_2 + H_2O \leftrightarrow H_2CO_3 \qquad \text{[Chemical equation 1-1]}$$

$$H_2CO_3 \leftrightarrow H^+ + HCO_3^- \qquad \text{[Chemical equation 1-2]}$$

$$HCO_3^- \leftrightarrow H^+ + CO_3^{2-} \qquad \text{[Chemical equation 1-3]}$$

The pH of the third flocculation reactor 113 may be 6.5-7.5. When the pH in the third flocculation reactor 113 is less than 6.5, not only the calcium concentration in a produced water PW may increase, but also the operation state of the reverse-osmosis membrane unit 130 may become poor, and the pH in the third flocculation reactor 113 exceeds 7.5, not only the fluoride concentration increases, but also the operation state of the reverse-osmosis membrane unit 130 may become poor.

The method for reusing wastewater may further include, between the step (S40-2) and the step (S40-4), a step (S40-3) of producing a second treated water TW2 by passing the first treated water TW1 through the second flocculation reactor 112. In this case, the step (S40-4) may be a step of producing a third treated water TW3 by passing the second treated water TW2, not the first treated water TW1, through the third flocculation reactor 113.

There may be no chemical introduced into the second flocculation reactor 112. Accordingly, the flocculation reaction occurring in the first flocculation reactor 111 may stably continue to occur in the second flocculation reactor 112.

A fourth chemical C4 may be introduced into a fourth flocculation reactor 114.

The fourth chemical C4 may include an anionic polymer flocculant.

The anionic polymer flocculant may include an anionic polyacrylamide, sodium alginate, sodium polyacrylate, a maleate copolymer, a partially hydrolyzed polyacrylamide, or a combination thereof.

The maleate copolymer refers to any copolymer including a repeating unit derived from maleate salt and other repeating units.

In the step (S40-8), the sedimentation tank 115 may distinguish and remove granular solids from treated water (that is, fifth treated water TW5). Operating linear velocity of the sedimentation tank 115 may be preferably about 0.5 m/hr to about 6 m/hr.

In addition, a portion of settled sludge SL may be circulated to the first flocculation reactor 111 and utilized to maintain an appropriate sludge concentration in the first flocculation reactor 111. Here, an appropriate sludge circulation ratio may be 1-15% (volume) with respect to raw water.

In addition, a portion of the sludge SL produced in the step (S40-8) may be returned to the first flocculation reactor 111 and the rest of the sludge SL may be discharged to the outside. The sludge SL returned to the first flocculation reactor 111 may act as a seed that promotes flocculation reaction.

Referring to FIG. 2 and FIG. 4, the step (S60) may include step (S60-2) of producing a sixth treated water TW6 by passing the fifth treated water TW5 through the anoxic tank 122, step (S60-4) of producing a seventh treated water TW7 by passing the sixth treated water TW6 through the aerobic tank 123, and step (S60-6) of producing an eighth treated water TW8 by passing the seventh treated water TW7 through a separation membrane tank 124.

There may be no chemical introduced into the anoxic tank 122.

In addition, in the anoxic tank 122, there may be a denitrification reaction occurring as shown in Chemical Equation 2 by denitrification bacteria.

$$2NO_3^- 10e^- + 12H^+ \rightarrow N_2 + 6H_2O \qquad \text{[Chemical Equation 2]}$$

The denitrification bacteria may include *Pseudomonas, Bacillus, Spirillum, Hyphomicrobium, Agrobacterium, Acinetobacter, Propionibacterium, Rhizobium, Corynebacterium, Cytophaga, Thiobacillus, Alcaligenes, Pseudomonas fluorescens, P. Aeruginosa, P. denitrificans, Alcaligenes* sp., *Curvibacter delicatus, Acidovorax defluvii, Dokdonella koreensis, Flavobacterium limicola, Terrimonas ferruginea, Terrimonas lutea*, or a combination thereof.

In the aerobic tank 123, a fifth chemical C5 may be introduced thereinto, or there may be no chemical introduced thereinto.

The fifth chemical C5 may include sodium hydroxide.

In the aerobic tank 123, there may be a harmful chemical such as the fifth chemical C5, e.g. sodium hydroxide, introduced thereinto in order to supply alkalinity for nitrification of ammonia in the sixth treated water TW6, or there may be no chemical introduced thereinto. In the latter case, alkalinity produced by the third chemical C3 (e.g., carbon dioxide) introduced into the third flocculation reactor 113 may be utilized in the aerobic tank 123, so as to minimize the amount of, or completely eliminate, the fifth chemical C5 introduced into the aerobic tank 123, and as a result, the amount of the fifth chemical C5 may be reduced by 97% or more relative to amounts that are commonly added in the art.

Alkalinity ($HCO_3^-$) in a nitrification reaction occurring in the aerobic tank 123 may be consumed by a reaction shown in Chemical Equation 3.

$$NH_4^+ 2HCO_3^- + 2O_2 \_ NO_3^- + 2CO_{2+3}H_2O \qquad \text{[Chemical Equation 3]}$$

In addition, in the aerobic tank 123, there may be a nitrification reaction occurring as shown in Chemical Equation 4 by nitrifying bacteria.

$$NH_4^+ + 2O_2 \rightarrow NO_3^+ + H_2O^+ 2H^+ \qquad \text{[Chemical Equation 4]}$$

The nitrifying bacteria may act to oxidize ammonia to nitrite ($NO_2^-$), or oxidize nitrite ($NO_2^-$) to nitrate ($NO_3^-$).

The nitrifying bacteria may include *Nitrosomonas europaea, Nitrosomonas nitrosa, Nitrosomonas_uc, Nitrosomonas* AB117705_s, *Nitrospira_uc, Nitrosospira multiformis, Nitrosospira tenuis, Nitrospira japonica, Nitrospiraceae_uc, Nitrobacter hamburgensis, Nitrobacter winogradskyi* group, *Nitrobacter_uc, Nitrosomonadaceae_uc*, or a combination thereof.

In addition, the method for reusing wastewater may further include step (S60-8) of passing unfiltered water remaining in the separation membrane tank 124 through a deaeration tank 121, and step (S60-10) of passing effluent of the deaeration tank 121 through the anoxic tank 122.

The step (S60-8) may be a step of removing dissolved oxygen in the unfiltered water remaining in the separation membrane tank 124.

In addition, the method for reusing wastewater may further include step (S60-12) of passing effluent of the separation membrane tank 124 through an MBR treated water tank 125.

There may be no chemical introduced into the MBR treated water tank 125.

In addition, the method for reusing wastewater may further include, between the step (S60) and the step (S80), step (S70) of introducing at least one from among a third chemical C3, a sixth chemical C6, and a seventh chemical C7 into effluent of an MBR 120 (specifically, effluent of the separation membrane tank 124) before the effluent is introduced into the reverse-osmosis membrane unit 130.

The third chemical C3 may include a pH control agent and the pH control agent may include carbon dioxide.

The sixth chemical C6 may include a disinfectant.

The disinfectant may include a chlorine-based chemical, a bromine-based chemical, an iodine-based chemical, or a combination thereof.

In particular, the disinfectant may include monochloramine, dichloramine, trichloramine, bromochloramine, sodium hypochlorite, sodium hypobromate, hypoiodic acid, sodium periodate, sodium iodate, or a combination thereof.

The seventh chemical may include an anti-scaling agent.

The anti-scaling agent may include polyphosphates, organophosphates, polycarboxylates, polyacrylates, or a combination thereof. In particular, the anti-scaling agent may include sodium hexametaphosphate (SHMP), 2-phosphonobutane-1,2,4-tricarboxylic acid (PBTC), polyacrylic acid (PAA), polymethacrylic acid (PMMA), polymaleic acid (PMA), or a combination thereof.

The effluent of the MBR 120 (e.g., effluent of the separation membrane tank 124 or the MBR treated water tank 125) may be adjusted to a pH level of about 5.8 to about 6.5, and supplied to the reverse-osmosis membrane unit 130. It is difficult in practice to realize a case in which the effluent of the MBR 120 being supplied to the reverse-osmosis membrane unit 130 has a pH of less than 5.8, and if the pH of the effluent exceeds 6.5, there is a problem in that the operating state of the reverse-osmosis membrane unit 130 becomes poor.

The step (S80) may be, as the main process of the method for reusing wastewater, a step of which the objective is to produce a treated water suitable for a reusable water usage site, by removing organic matters and inorganic ionic matters remaining in MBR treated water (e.g., the eighth treated water TW8).

In particular, in the step (S80), it is preferable that an operating flux of the reverse-osmosis membrane unit 130 be about 10 L/m$^2$·hr to about 35 L/m$^2$·hr, and the recovery rate be about 60% to about 90%.

In particular, the method for reusing wastewater may further include, between the step (S80) and the step (S100), step (S90) of cleaning a reverse-osmosis membrane by adding an eighth chemical C8 to the reverse-osmosis membrane unit 130. In particular, the step (S90) may be a step in which a chemical cleaning is performed to remove contaminants, when the contaminants cause contamination by being attached to the surface of a reverse-osmosis membrane in the step (S80).

The step (S90) may include recovery cleaning 1 RC1 repeatedly performed at an interval T1 (e.g., every 1-3 months) using a cleaning agent of a first concentration (e.g., 2-20 wt %), and maintenance cleaning 1 MC1 repeatedly performed at an interval T2 (e.g., every 1-3 days) that is shorter than the T1 interval, using a cleaning agent of a second concentration (e.g., 0.1-2 wt %) that is lower than the first concentration. Here, the contact time of a cleaning agent with water to be cleaned may be about 1 hour to about 24 hours. In particular, the second concentration may be about 1% to about 50% of the first concentration.

The eighth chemical C8 may include a clean-in-place (CIP) cleaning agent.

The CIP cleaning agent may include a disinfectant and an acid cleaning agent, but may not include any alkaline cleaning agent.

Since the disinfectant may replace an alkaline cleaning agent, there is no need for additional alkaline cleaning agents.

The disinfectant used as the CIP cleaning agent may be the same as the disinfectant used as the sixth chemical C6.

The acid cleaning agent may be a liquid material having a pH of about 1.0 to about 5.0. An acid cleaning agent satisfying the above condition may be a non-toxic material.

The acid cleaning agent may include a citric acid-based chemical, an acetic acid-based chemical, or a combination thereof.

In particular, the acid cleaning agent may include hydroxyacetic acid, acetic acid, sodium ethylenediaminehydroxyethyl triacetate, ammonium citrate, citric acid, ammonium dihydrogen citrate, or a combination thereof.

Referring back to FIG. 2 to 4, an apparatus for reusing wastewater (100) according to an embodiment will be described in greater detail below.

First, as shown in FIG. 2 and FIG. 4, the apparatus for reusing wastewater (100) according to an embodiment may include a first flocculation reactor 111, a third flocculation reactor 113, a fourth flocculation reactor 114, a sedimentation tank 115, an anoxic tank 122, an aerobic tank 123, a separation membrane tank 124, and a reverse-osmosis membrane unit 130.

The first flocculation reactor 111 may be configured to flocculate a mixed wastewater RW to produce a first treated water TW1. Here, the first flocculation reactor 111 may be configured to operate at a pH of about 10.0 to about 11.5.

The third flocculation reactor 113 may be configured to further flocculate the first treated water TW1 to produce a third treated water TW3. Here, the third flocculation reactor 113 may be configured to operate at a pH of about 6.5 to about 7.5.

Figure 3:
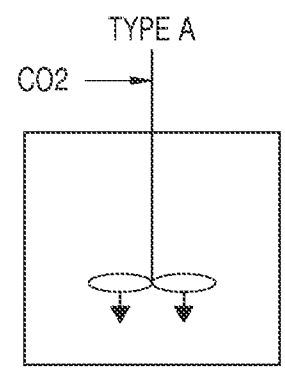
FIG. 3 is a diagram showing a method of introducing $CO_2$ into a third flocculation reactor in the method and apparatus for reusing wastewater depicted in FIG. 1.
Figure 3:
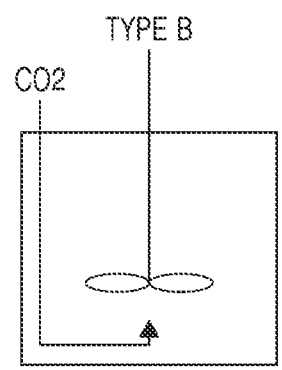

In addition, the apparatus for reusing wastewater 100 as illustrated in FIG. 3, may further include a mixer mounted in the third flocculation reactor 113, and the mixer may be configured to introduce carbon dioxide into the third flocculation reactor 113 therethrough (see TYPE A). However, the present inventive concept is not limited thereto, and carbon dioxide may be introduced into the third flocculation reactor 113 through a pipe, without using a mixer (see TYPE B).

In addition, the apparatus for reusing wastewater 100 may further include a second flocculation reactor 112 disposed between the first flocculation reactor 111 and the third flocculation reactor 113.

The fourth flocculation reactor 114 may be configured to further flocculate the third treated water TW3 to produce a fourth treated water TW4.

The sedimentation tank 115 may be configured to produce a fifth treated water TW5 and a sludge SL by settling the fourth treated water TW4.

In particular, the apparatus for reusing wastewater 100 may further include a first return line CL1 configured to return a portion of the sludge SL produced in the sedimentation tank 115 to the first flocculation reactor 111.

The anoxic tank 122 may be configured to produce a sixth treated water TW6 by performing a denitrification reaction on the fifth treated water TW5.

The aerobic tank 123 may be configured to produce a seventh treated water TW7 by removing organic matters from the sixth treated water TW6 and performing a nitrification reaction.

The separation membrane tank 124 may be configured to produce an eighth treated water TW8 by removing particulate matters from the seventh treated water TW7.

For example, the separation membrane tank 124 may include a microfiltration membrane (MF) or an ultrafiltration membrane (UF). A separation membrane having a nominal pore size between about 0.1 μm and about 10 μm may be defined as a MF, and a separation membrane having a nominal pore size between about 0.001 μm and about 0.1 μm may be defined as a UF.

The separation membrane, depending on the shape of the module, may be classified as a hollow fiber module, a tubular module, or a plate and frame module, and may be preferably a hollow fiber module or a tubular module. The separation membrane may have an operating flux of, preferably about 10 L/m²·hr to about 100 L/m²·hr for a hollow fiber module, and preferably about 30 L/m²·hr to about 500 L/m²·hr for a tubular module. The recovery rate of the separation membrane may be preferably about 80% to about 98% for both a hollow fiber module and a tubular module.

In addition, the apparatus for reusing wastewater 100 may further include a deaeration tank 121 configured to remove dissolved oxygen from unfiltered water remaining in the separation membrane tank 124 and introduce the unfiltered water into the anoxic tank 122, and a second return line CL2 configured to return the unfiltered water remaining in the separation membrane tank 124 to the deaeration tank 121.

In addition, the apparatus for reusing wastewater 100 may be configured such that an effluent of the separation membrane tank 124 (e.g., the eighth treated water TW8) is adjusted to a pH of about 5.8 to about 6.5 before being supplied to the reverse-osmosis membrane unit 130.

The reverse-osmosis membrane unit 130 may be configured to remove organic matters and inorganic ion components from the eighth treated water TW8 to thereby produce a concentrated water CW and a produced water PW. The reverse-osmosis membrane unit 130 may include a brackish water reverse-osmosis membrane or a seawater reverse-osmosis membrane.

A method and apparatus for reusing wastewater according to an embodiment may have the advantages as follows.

(1) Operational safety of the wastewater reusing process may be improved by classification of sources of wastewater, incorporation of a pre-treatment process, and process optimization to minimize a membrane fouling in a reverse-osmosis membrane unit.

(2) In a flocculation-sedimentation process, fouling of the reverse-osmosis membrane unit can be prevented by minimizing the concentrations of calcium and fluoride, etc. which cause inorganic scales to build up in a reverse-osmosis membrane unit, and the costs related to cleaning chemicals and operating costs may be reduced.

(3) Unlike a conventionally used combination of slack lime and a strong acid, or combination of slack lime and a fluoride scavenger, carbon dioxide is applied, replacing strong acids, which are toxic chemicals, and costly fluoride scavengers. Accordingly, by excluding toxic chemicals, improvement of safety for operators may be achieved, and by replacing costly fluoride scavengers with carbon dioxide, the operating costs may be reduced.

(4) Following the introduction of slack lime, carbon dioxide gas is dissolved in an alkaline condition, thus generating alkalinity, and this may be utilized as an alkalinity source necessary in a nitrification process, which is a subsequent bioprocessing process. Therefore, it is possible to improve process operational safety and reduce the operational costs by eliminating the use of, or minimizing the amount of caustic soda (NaOH) which is toxic chemical as an additional alkalinity source.

(5) To remove organic matters and nitrogen compounds among membrane fouling substances in the reverse-osmosis membrane unit, the wastewater undergoes a membrane bioreactor (MBR) process. Here, among organic matters causing membrane fouling in the reverse-osmosis membrane unit, by removing easily biodegradable substances such as alcohols through a bioprocessing process in advance, the growth of bacteria disintegrating such substances can be inhibited and membrane fouling by organic matters can be prevented in a subsequent reverse-osmosis membrane unit.

(6) In the reverse-osmosis membrane unit, residual inorganic ions and residual organic matters may be removed so as to produce a concentration of ions and organic matters that is appropriate for reused water. Here, for the stable operation of the reverse-osmosis membrane unit, a chemical cleaning may be applied as a general occasional high-concentration cleaning, and a low-concentration maintenance cleaning that is applicable when contamination becomes severe.

Hereinbelow, the present disclosure will be described in greater detail with reference to examples, but is not limited to the examples disclosed herein.

Examples 1-7 and Comparative Examples 1-6

(Manufacturing of the apparatus)
An apparatus for reusing wastewater having configurations as shown in FIG. 2 was manufactured.
(Operation of the Apparatus: Flocculation-Sedimentation Process)

Flocculation process consists of four flocculation reactors in a step-wise manner, and slack lime was introduced into a first flocculation reactor to react with fluoride to form calcium fluoride, thereby resulting in inducing precipitation and removal of the calcium fluoride. Here, the slack lime was injected in a specific amount that allows the contents in the first flocculation reactor to have a pH value disclosed in Table 1 below. Here, to remove hydrogen peroxide, which hinders flocculation, a hydrogen peroxide scavenger (catalase) was further injected at a concentration of 500 ppm (by weight). Thereafter, carbon dioxide of 99.9 vol % purity was injected to the third flocculation reactor for neutralization, and the carbon dioxide was injected such that the contents in the third flocculation reactor had a pH value disclosed in Table 1 below. Thereafter, an anionic polymer (anionic polyacrylamide) was injected to the fourth flocculation reactor to a concentration of 3 mg/L to enlarge particle aggregates, which were then introduced into a sedimentation tank and removed in the form of slurry. Here, the operating linear velocity of the sedimentation tank was 3.5 m/hr.

(Operation of the Apparatus: MBR Process)

To remove organic matters and ammonia nitrogen from the wastewater, an MBR process was applied. Here, the average pore size of the separation membrane was 0.03 μm, the operating flux was 20 L/m$^2$·hr, and the recovery rate was 98% or more.

(Operation of the Apparatus: Reverse-Osmosis Membrane Process)

To remove ions and residual organic matters, a brackish water reverse osmosis membrane (BWRO) was used as a reverse-osmosis membrane. The operating flux was 16 L/m$^2$·hr and the recovery rate was 75%. In addition, to prevent inorganic scales from building up in the reverse-osmosis membrane process, carbon dioxide was injected to a preceding process so as to adjust the pH to a value described in Table 1.

TABLE 1

|  | pH of first flocculation reactor contents | pH of third flocculation reactor contents | pH of reverse-osmosis membrane unit influent water |
|---|---|---|---|
| Example 1 | 10.8 | 7.0 | 6.4 |
| Example 2 | 10.0 | 7.0 | 6.4 |
| Example 3 | 11.5 | 7.0 | 6.4 |
| Example 4 | 10.8 | 6.5 | 6.4 |
| Example 5 | 10.8 | 7.5 | 6.4 |
| Example 6 | 10.8 | 7.0 | 5.8 |
| Example 7 | 10.8 | 7.0 | 6.5 |
| Comparative Example 1 | 9.5 | 7.0 | 6.4 |
| Comparative Example 2 | 12.0 | 7.0 | 6.4 |
| Comparative Example 3 | 10.8 | 6.0 | 6.4 |
| Comparative Example 4 | 10.8 | 8.0 | 6.4 |
| Comparative Example 5 | 10.8 | 7.0 | 5.0 |
| Comparative Example 6 | 10.8 | 7.0 | 7.0 |

Evaluation Example 1: NaOH Consumption Data in MBR Process Following Carbon Dioxide Injection Evaluation was made on how much the NaOH consumption was reduced in the MBR process as carbon dioxide was injected to the third flocculation reactor. The results thereof is shown in FIG. 5.

Figure 5:
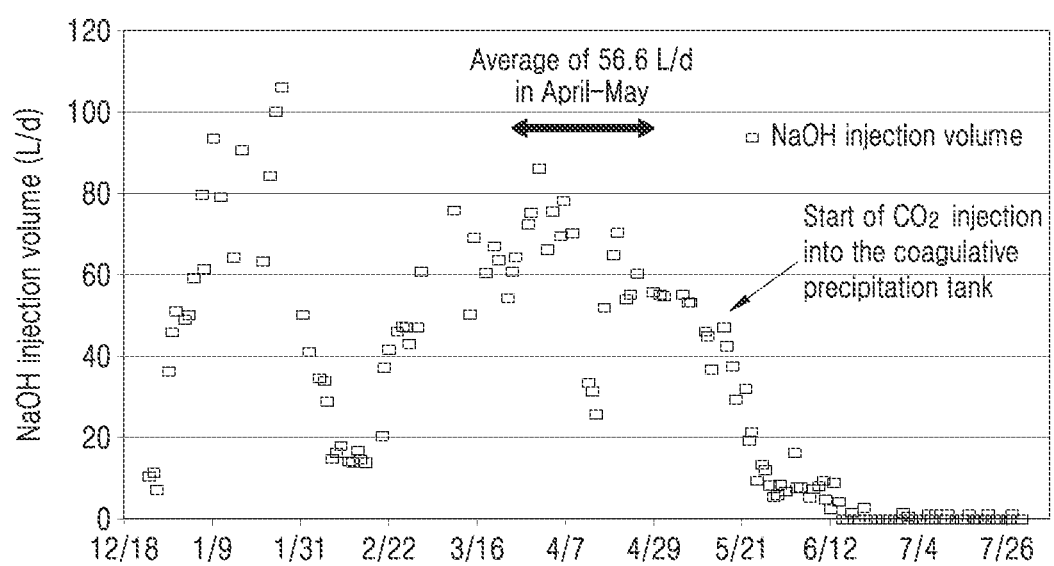
FIG. 5 is a graph showing a change in sodium hydroxide consumption according to carbon dioxide injection in an actual MBR process.

Referring to FIG. 5, when carbon dioxide was injected to the third flocculation reactor, the NaOH consumption drastically decreased while maintaining an equal level of a produced water quality. Here, the produced water refers to a treated water produced through the reverse-osmosis membrane unit.

Evaluation Example 2: Evaluation of Quality of a Produced Water

Quality of the produced water prepared in Examples 1-7 and Comparative Examples 1-6 was evaluated. The results thereof are shown in Table 2 below. In Table 2 below, "NA" indicates that when using $CO_2$ as a pH control agent, it was impossible to achieve pH 5.0, thus rendering the test in given conditions impossible. In "Operating state of reverse-osmosis membrane unit", "Poor" indicates an increase in the operating pressure due to membrane contamination, and "Good" indicates when the operating pressure did not exhibit such an increase.

TABLE 2

|  | Fluoride concentration (mg/L) | Calcium concentration (mg/L) | Operating state of reverse-osmosis membrane unit |
|---|---|---|---|
| Example 1 | 14.4 | 142 | Good |
| Example 2 | 27 | 59 | Good |
| Example 3 | 13.5 | 185 | Good |
| Example 4 | 14.8 | 145 | Good |
| Example 5 | 22.2 | 140 | Good |
| Example 6 | 15 | 147 | Good |
| Example 7 | 14.5 | 145 | Good |
| Comparative Example 1 | 40 | 33 | Poor |
| Comparative Example 2 | 16 | 250 | Poor |
| Comparative Example 3 | 19 | 230 | Poor |
| Comparative Example 4 | 35 | 135 | Poor |
| Comparative Example 5 | NA | NA | NA |
| Comparative Example 6 | 16 | 154 | Poor |

As shown in Table 2, the produced water prepared in Examples 1-7 were found to have a low fluoride concentration (<25 mg/L) and a low calcium concentration (<190 mg/L), and show a good operation state of the reverse-osmosis membrane unit.

On contrary, the produced water prepared in Comparative Examples 1 and 4 were found to have a low calcium concentration, but have a high fluoride concentration, and show a poor operating state of the reverse-osmosis membrane unit.

Further, the produced water prepared in Comparative Examples 2-3 were found to have a low fluoride concentration, but have a high calcium concentration, and show a poor operating state of the reverse-osmosis membrane unit.

Further, in Comparative Example 5, the injection of carbon dioxide alone failed to bring the pH of influent water in the reverse-osmosis membrane unit down to pH 5.0, and therefore, the test itself could not be performed to meet the condition.

Further, the produced water prepared in Comparative Example 6 was found to have a low fluoride concentration and a low calcium concentration, but show a poor operating state of the reverse-osmosis membrane unit.

Although the present invention has been described with reference to the drawings and examples, these embodiments are merely exemplary, and those skilled in the art shall understand that various modifications and equivalent other embodiments are possible therefrom. Therefore, the full scope of technical protection for the present invention shall be defined by the technical concept of the following claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method for reusing wastewater, the method comprising:
producing a mixed wastewater by mixing multiple types of wastewater (S20);
performing a first purification by passing the mixed wastewater through a flocculation-sedimentation unit (S40);
performing a second purification by passing an effluent of the flocculation-sedimentation unit through a membrane bioreactor (MBR) (S60);
performing a third purification by passing an effluent of the MBR through a reverse-osmosis membrane unit (S80); and
reusing an effluent of the reverse-osmosis membrane unit as a cooling water or industrial water (S100),
wherein the mixed wastewater refers to wastewater containing a mixture of hydrofluoric acid wastewater, other acidic wastewater, and alkaline wastewater produced from the semiconductor manufacturing process, or display manufacturing process, a total phosphorus (T-P) concentration in the mixed wastewater is 10 mg/L or less,
wherein the step (S40) comprises:
producing a first treated water by passing the mixed wastewater through a first flocculation reactor (S40-2);
producing a third treated water by passing either the first treated water or a second treated water through a third flocculation reactor, wherein the second treated water is obtained by passing the first treated water through a second flocculation reactor (S40-4);
producing a fourth treated water by passing the third treated water through a fourth flocculation reactor (S40-6); and
producing a fifth treated water and a sludge by passing the fourth treated water through a sedimentation tank (S40-8),
wherein a first chemical and a second chemical are introduced into the first flocculation reactor, a third chemical is introduced into the third flocculation reactor, and a fourth chemical is introduced into the fourth flocculation reactor,
wherein the first chemical comprises slaked lime, the second chemical comprises a hydrogen peroxide scavenger, the third chemical comprises a pH control agent, and the fourth chemical comprises an anionic polymer flocculant,
wherein a pH of the first flocculation reactor is 10.0 to 11.5, and a pH of the third flocculation reactor is 6.5 to 7.5, wherein the effluent of the MBR is adjusted to a pH of 5.8 to 6.5 and then supplied to the reverse-osmosis membrane unit,
wherein the step (S60) comprises:
producing a sixth treated water by passing the fifth treated water through an anoxic tank (S60-2);
producing a seventh treated water by passing the sixth treated water through an aerobic tank (S60-4);
producing an eighth treated water by passing the seventh treated water through a separation membrane tank (S60-6);
wherein the step (S60) further comprises step (S60-8) of passing an unfiltered water remaining in the separation membrane tank through a deaeration tank, and step (S60-10) of passing an effluent of the deaeration tank through the anoxic tank.

2. The method of claim 1,
wherein no chemical is introduced into the second flocculation reactor.

3. The method of claim 1,
wherein a portion of the sludge produced in the step (S40-8) is returned to the first flocculation reactor, and the remainder of the sludge is discharged to outside the sedimentation tank.

4. The method of claim 1,
wherein the aerobic tank has a fifth chemical or no chemical introduced thereinto, and the anoxic tank and the separation membrane tank have no chemical introduced thereinto.

5. The method of claim 4,
wherein the fifth chemical comprises sodium hydroxide.

6. The method of claim 1,
further comprising, between the step (S60) and the step (S80), step (S70) of introducing at least one from among the third chemical, a sixth chemical, and a seventh chemical into the effluent of the MBR prior to being introduced into the reverse-osmosis membrane unit.

7. The method of claim 6,
wherein the sixth chemical comprises a disinfectant, and the seventh chemical comprises an anti-scaling agent.

8. The method of claim 1,
further comprising, between the step (S80) and the step (S100), step (S90) of cleaning a reverse-osmosis membrane by adding an eighth chemical to the reverse-osmosis membrane unit, wherein the eighth chemical comprises a clean-in-place (CIP) cleaning agent.

9. An apparatus for reusing wastewater, comprising: a first flocculation reactor configured to produce a first treated water by flocculating a mixed wastewater;
a third flocculation reactor configured to produce a third treated water by further flocculating the first treated water;
a fourth flocculation reactor configured to produce a fourth treated water by further flocculating the third treated water;
a sedimentation tank configured to produce fifth treated water and sludge by settling the fourth treated water;
an anoxic tank configured to produce a sixth treated water by performing a denitrification reaction on the fifth treated water;
an aerobic tank configured to produce a seventh treated water by removing organic matter from the sixth treated water and performing a nitrification reaction on the sixth treated water;
a separation membrane tank configured to produce an eighth treated water by removing particulate matter from the seventh treated water; and
a reverse-osmosis membrane unit configured to produce a concentrated water and a produced water by removing organic matter and inorganic ion components from the eighth treated water,
wherein the mixed wastewater refers to wastewater containing a mixture of hydrofluoric acid wastewater, other acidic wastewater, and alkaline wastewater produced from the semiconductor manufacturing process, or display manufacturing process, a total phosphorus (T-P) concentration in the mixed wastewater is 10 mg/L or less,
wherein a first chemical and a second chemical are introduced into the first flocculation reactor, a third chemical is introduced into the third flocculation reactor, and a fourth chemical is introduced into the fourth flocculation reactor, wherein the first chemical comprises slaked lime, the second chemical comprises a hydrogen peroxide scavenger, the third chemical comprises a pH control agent, and the fourth chemical comprises an anionic polymer flocculant, wherein a pH of the first flocculation reactor is 10.0 to 11.5, and a pH of the third flocculation reactor is 6.5 to 7.5, wherein an effluent of the separation membrane tank is adjusted to a pH of 5.8 to 6.5 and supplied to the reverse-osmosis membrane unit, further comprising a deaeration tank configured to remove dissolved oxygen from an unfiltered water remaining in the separation membrane tank and introduce the unfiltered water into the anoxic tank, and a second return line configured to return the unfiltered water remaining in the separation membrane tank to the deaeration tank.

10. The apparatus of claim 9, further comprising a mixer mounted in the third flocculation reactor, wherein the mixer is configured to introduce carbon dioxide into the third flocculation reactor therethrough.

11. The apparatus of claim 9, further comprising a first return line configured to return a portion of the sludge produced in the sedimentation tank to the first flocculation reactor.

12. The apparatus of claim 9, wherein the separation membrane tank comprises a microfiltration membrane (MF) or an ultrafiltration membrane (UF).

13. The apparatus of claim 9, wherein the reverse-osmosis membrane unit comprises a brackish water reverse-osmosis membrane or a seawater reverse-osmosis membrane.

* * * * *